(12) United States Patent
Yang et al.

(10) Patent No.: US 7,768,710 B2
(45) Date of Patent: Aug. 3, 2010

(54) OPTICAL FILM HAVING LUMINOUS FLUX

(75) Inventors: Stephen Yang, Hsinchu County (TW);
Tsung-Shien Tsai, Hsinchu (TW)

(73) Assignee: Gigastorage Corporation, Hsin Chu (TW)

( * ) Notice: Subject to any disclaimer, the term of this patent is extended or adjusted under 35 U.S.C. 154(b) by 217 days.

(21) Appl. No.: 12/183,870

(22) Filed: Jul. 31, 2008

(65) Prior Publication Data

US 2009/0059382 A1 Mar. 5, 2009

(30) Foreign Application Priority Data

Aug. 31, 2007 (TW) ............................... 96132369 A

(51) Int. Cl.
*G02B 27/30* (2006.01)
*F21V 7/04* (2006.01)
(52) U.S. Cl. .................... 359/641; 362/628; 359/599

(58) Field of Classification Search ................. 359/599, 359/619; 428/1.1; 264/1.1, 1.34; 362/627–628
See application file for complete search history.

(56) References Cited

U.S. PATENT DOCUMENTS

| 6,396,637 | B2 * | 5/2002 | Roest et al. | 359/627 |
| 6,456,437 | B1 * | 9/2002 | Lea et al. | 359/625 |
| 6,836,368 | B2 * | 12/2004 | Niida et al. | 359/619 |
| 7,309,149 | B2 * | 12/2007 | Lee et al. | 362/339 |

* cited by examiner

*Primary Examiner*—Ricky L Mack
*Assistant Examiner*—James R Greece
(74) *Attorney, Agent, or Firm*—Jackson IPG PLLC

(57) ABSTRACT

An optical film has symmetrical arrangement light-collecting units. The light-collecting units can be extended for several times. The light-collecting unit has apex angles and base angles with different degrees. Thus, a uniform luminous flux and a good light intensity are obtained for the optical film.

5 Claims, 22 Drawing Sheets

OPTICAL FILM HAVING LUMINOUS FLUX

FIELD OF THE INVENTION

The present invention relates to an optical film; more particularly, relates to, after passing a light source, obtaining a uniform luminous flux with interior angles having different degrees in a structure of a light-collecting unit which has a symmetrical arrangement.

DESCRIPTION OF THE RELATED ARTS

As shown in FIG. 15, a first general optical film 2f has a symmetrical structure, whose apex angles are 90 degrees (°) and 50 micrometers in pitch. As shown in FIG. 16, after a light source passes through the first general optical film 2f, a good luminous flux is obtained at center of 0° yet with a bad luminous flux between −30° and +30°.

As shown in FIG. 17, a second general optical film 2g has an unsymmetrical structure whose base angles are 55° and 35° separately. As shown in FIG. 18 after a light source passes through the second general optical film 2g, a luminous flux is slanting to a side with an asymmetrical luminous flux between −30° and +30°.

As shown in FIG. 19, a third general optical film 2h has a symmetrical structure, whose base angles are 55° and 35° separately. As shown in FIG. 20, after a light source passes through the third general optical film 2h, a good luminous flux is obtained at center of 0° yet with a luminous flux having a large variation between −30° and +30°.

Light sources passes through the above general optical films; but none uniform luminous flux is obtained at center and between −30° and +30°. Hence, the prior arts do not fulfill all users' requests on actual use.

SUMMARY OF THE INVENTION

The main purpose of the present invention is, after passing a light source, to obtain a uniform luminous flux with interior angles having different degrees in a structure of a light-collecting unit.

To achieve the above purpose, the present invention is an optical film having a uniform luminous flux, comprising a plurality of light-collecting units, where the plurality of light-collecting units has a symmetrical arrangement; the plurality of light-collecting units has a first base angle and a second base angle; each of the base angles is between 35 degrees (°) and 55°; the light-collecting unit has a first apex angle, a second apex angle and a third apex angle; each of the first, the second and the third apex angles are between 80° and 100°; respective vertical distances between vertices of the first, the second and the third apex angles and a base of the light-collecting unit has a ratio of 22:21±60%:18; vertices of the first, the second and the third apex angles are straightly vertical to the base of the light-collecting unit at three points to obtain a length ratio of 22:15±60%:25±60%:18 by dividing the base of the light-collecting unit with the three points; and thus a uniform luminous flux at canter of 0° and between +30° and −30° is obtained through the light-collecting units. Accordingly, a novel optical film having a uniform luminous flux is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
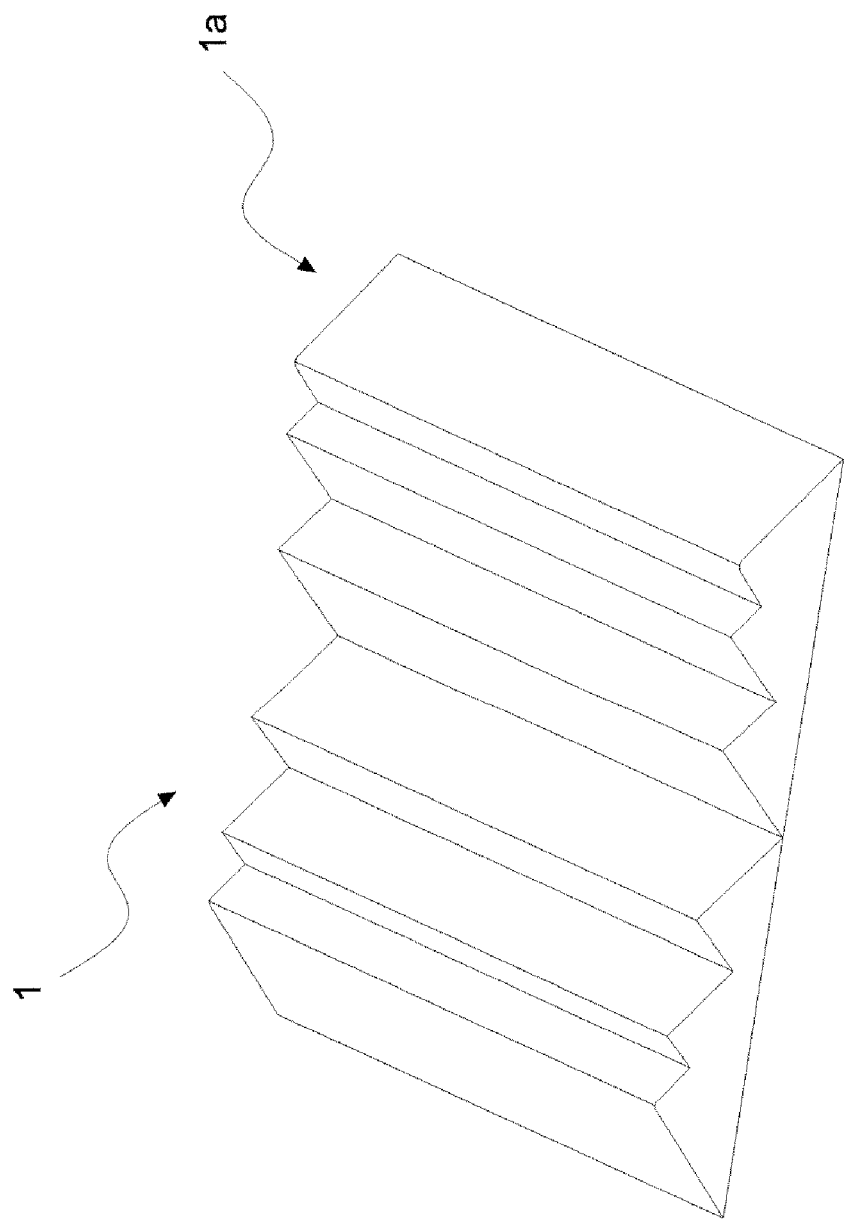
FIG. 1 is the perspective view showing the preferred embodiment according to the present invention.
Figure 2A:
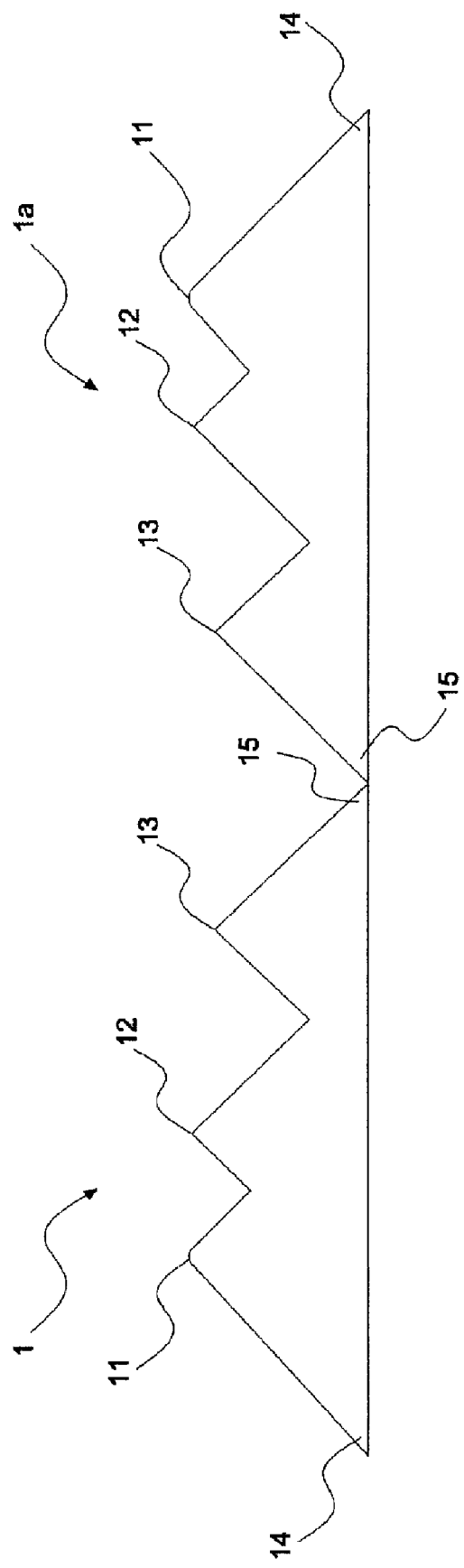
FIG. 2A to FIG. 2C are the sectional views showing the onefold, the twofold and the threefold sets of symmetrical optical films.
Figure 2B:
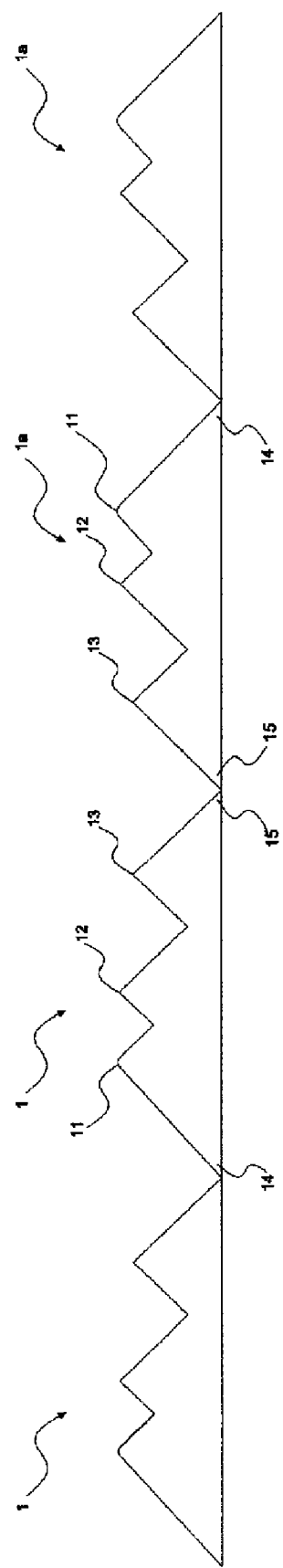
Figure 2C:
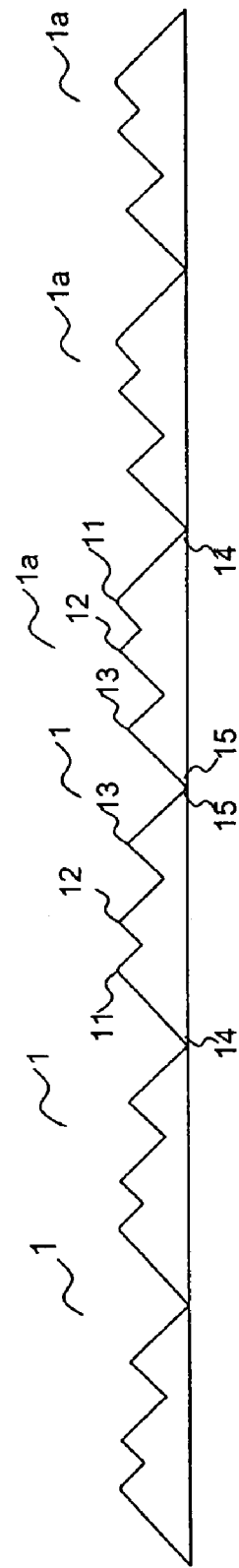

Please refer to FIG. 1 and FIG. 2A to FIG. 2C, which are a perspective view showing a preferred embodiment according to the present invention and sectional views showing a onefold set of symmetrical optical films, a twofold set of symmetrical optical films and a threefold set of symmetrical optical films. As shown in the figures, the present invention is an optical film having a uniform luminous flux, comprising a plurality of light-collecting units 1, 1a, where the plurality of light-collecting units 1, 1a, has a symmetrical arrangement; every light-collecting unit 1, 1a has a first apex angle 11, a second apex angle 12 and a third apex angle 13; each of the first, the second and the third apex angles 11, 12, 13 is between 80 degrees (°) and 100°; the first apex angle 11 is an apex angle having a round vertex and the round vertex has a radius between 2 and 5 microns (μm); the plurality of light-collecting units 1, 1a have a first base angle 14 and a second base angle 15; each of the first and the second base angles 14, 15 is between 35° and 55°; and respective vertical distances between vertices of the first, the second and the third apex angles 11, 12, 13 and a base of the light-collecting unit 1, 1a have a ratio of 22:21±60%:18 to obtain a length ratio of 22:15±60%:25±60%:18 by dividing the base of the light-collecting unit with three points at which points vertices of the first, the second and the third apex angles 11, 12, 13 are straightly vertical to the base of the light-collecting unit 1, 1a. Furthermore, the symmetrical arrangement of the light-collecting units 1, 1a can be extended two times as shown in FIG. 2B or three times as shown in FIG. 2C, where even an extension more than three times is possible. Thus, a novel optical film having a uniform luminous flux is obtained.

Figure 3:
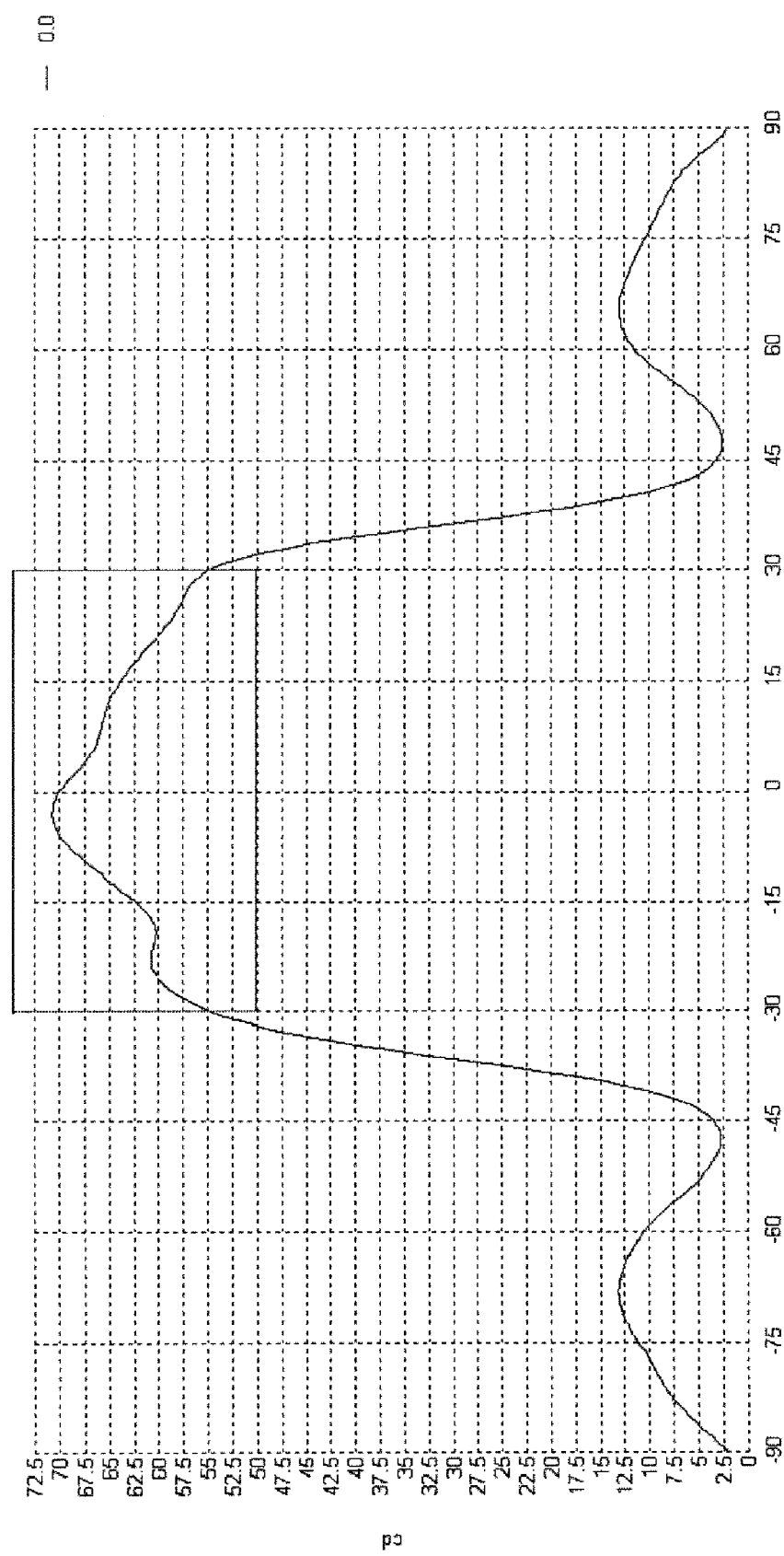
FIG. 3 and FIG. 4 are the views showing the light intensity curves of the onefold and the twofold sets of symmetrical optical films.
Figure 4:
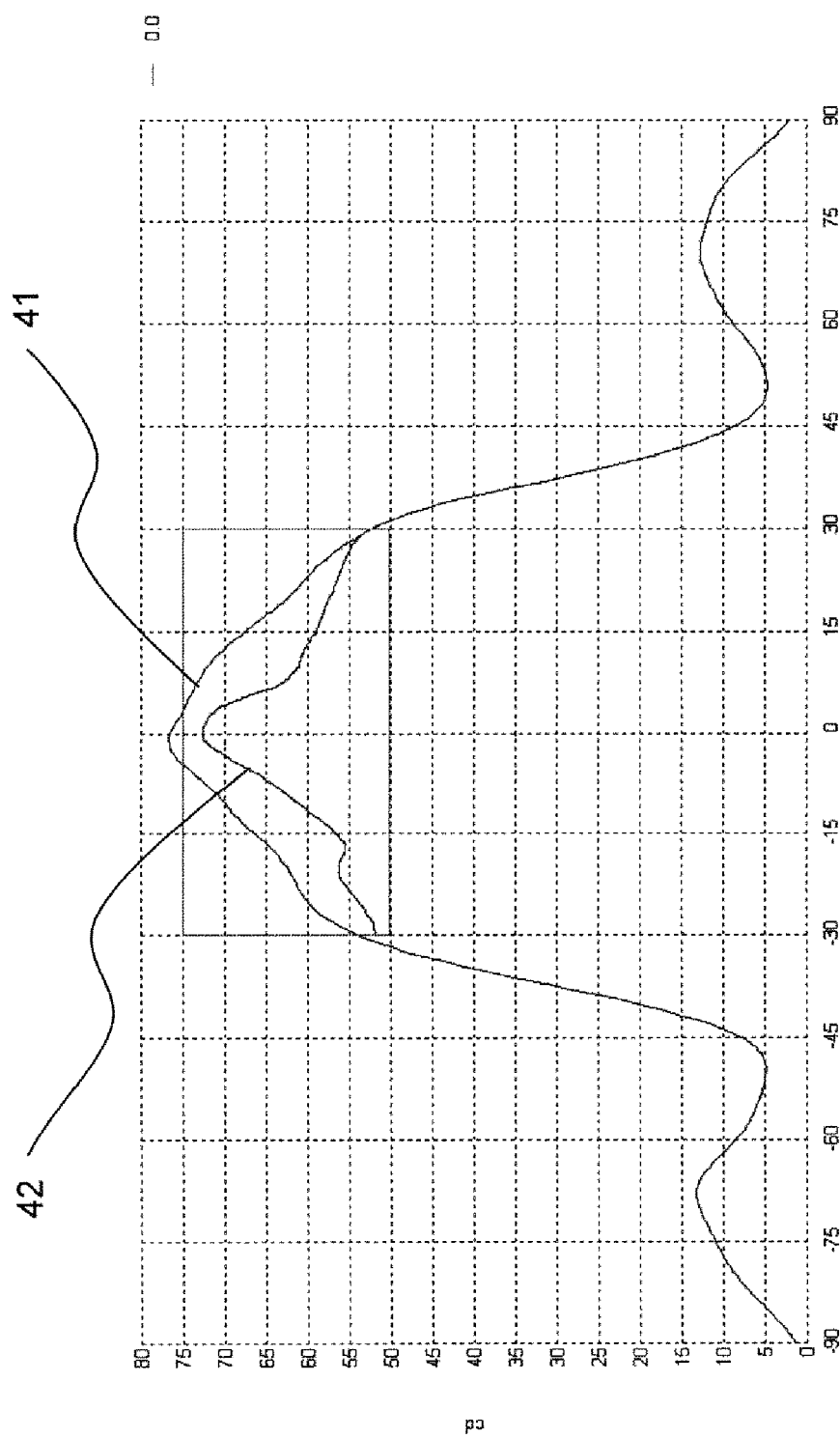

Please refer to FIG. 3 and FIG. 4, which are views showing light intensity curves of a onefold set of symmetrical optical films and a twofold set of symmetrical optical films. As shown in the figures, on using the present invention, a light source passes through a light-collecting unit. After the light source passes through the light-collecting unit, a uniform luminous flux at canter of 0° and between +30° and −30° is obtained through a degree ratio of the first, the second and the third apex angles and a length ratio on the base of the light-collecting unit obtained by dividing the base of the light-collecting unit with three points at which points vertices of the first, the second and the third apex angles are straightly vertical to the base of the light-collecting unit. When the first and the second base angles are both 45°, luminous flux at canter of 0° and between +30° and −30° is good and uniform. After comparing a light intensity curve of the present invention 41 and that of a general optical film 42, it is found that the present invention has a better quality and performance.

Please refer to FIG. 5 to FIG. 14, which are views showing a first optical film and its light intensity curve; a second optical film and its light intensity curve; a third optical film and its light intensity curve; a fourth optical film and its light intensity curve; and a fifth optical film and its light intensity curve. As shown in the figures, by changing angle degrees of a first and a second base angles, the following effects are obtained:

EXAMPLE (A)

Figure 5:
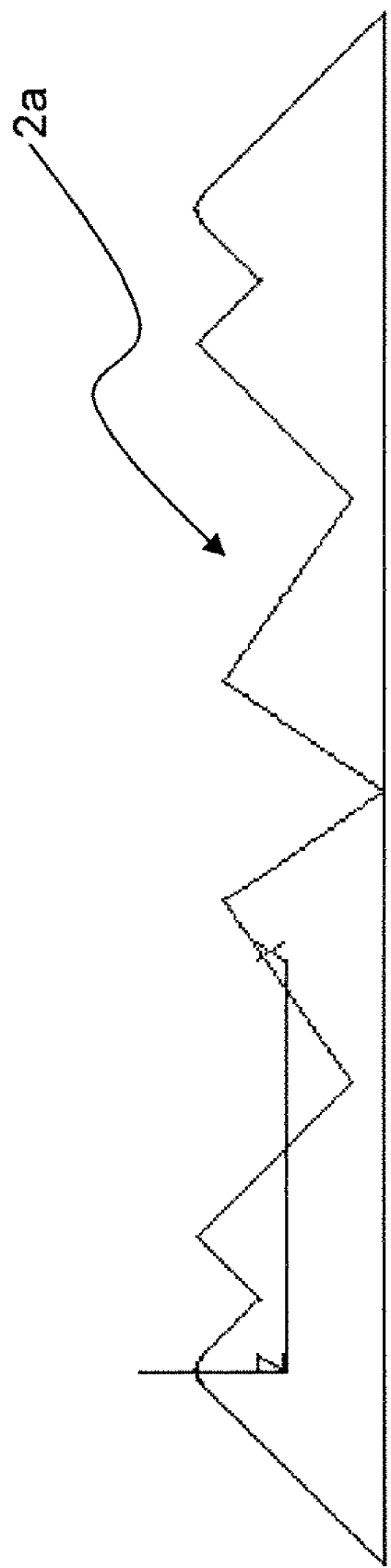
FIG. 5 and FIG. 6 are the views showing the first optical film and its light intensity curve.
Figure 6:
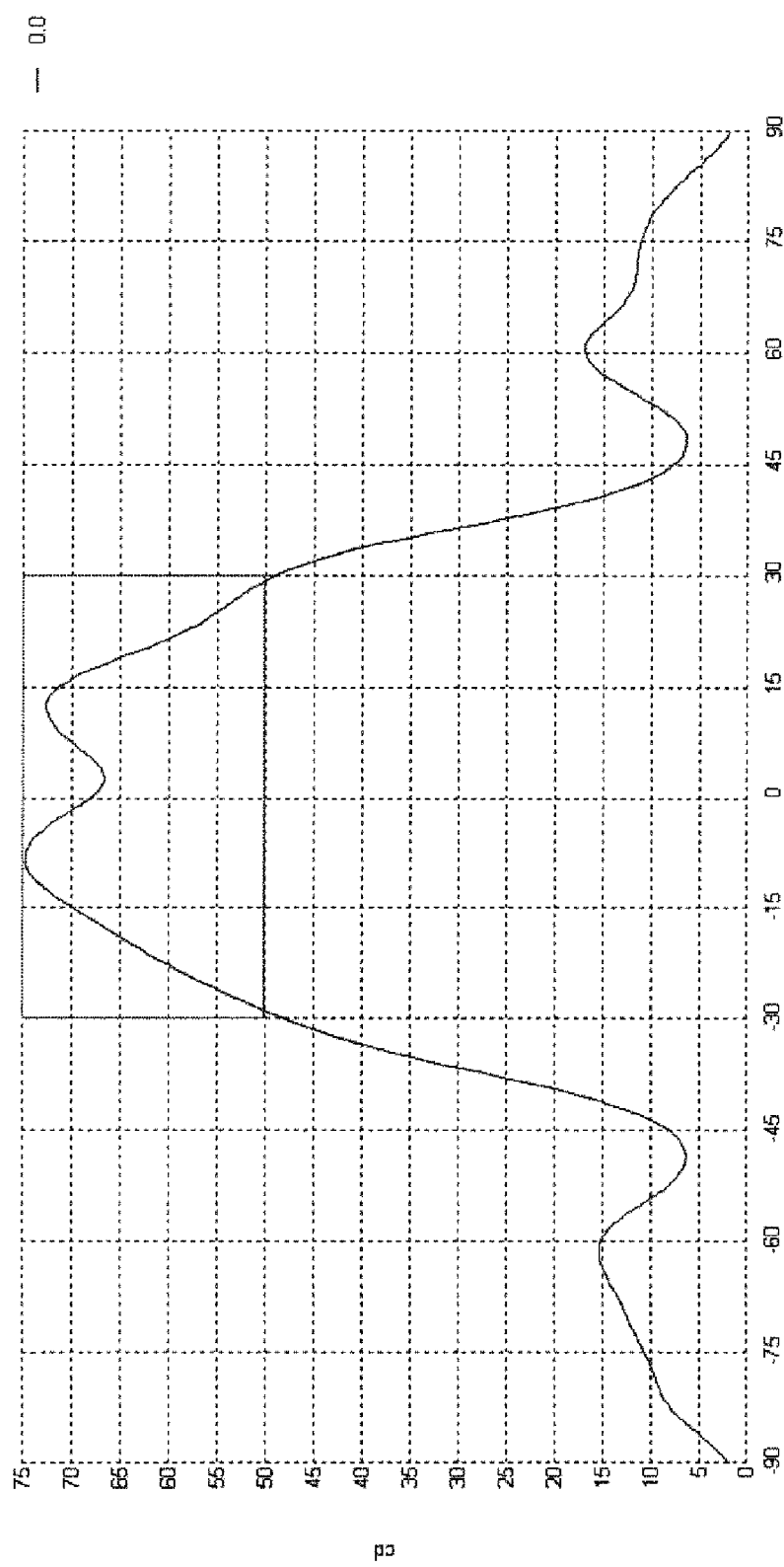

As shown in FIG. 5, first optical films 2a are symmetrically arranged and a first base angle and a second base angle of the first optical film 2a are 35° and 55° respectively. As shown in FIG. 6, after a light source passes the first optical films 2a, a sinking on a light intensity curve is found at center of 0° and effect of luminous flux is not perfect.

EXAMPLE (B)

Figure 7:
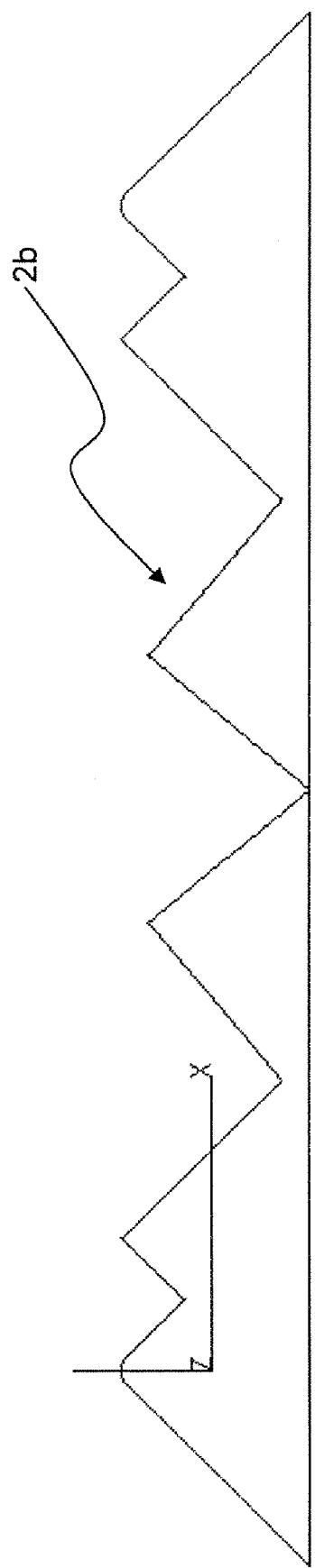
FIG. 7 and FIG. 8 are the views showing the second optical film and its light intensity curve.
Figure 8:
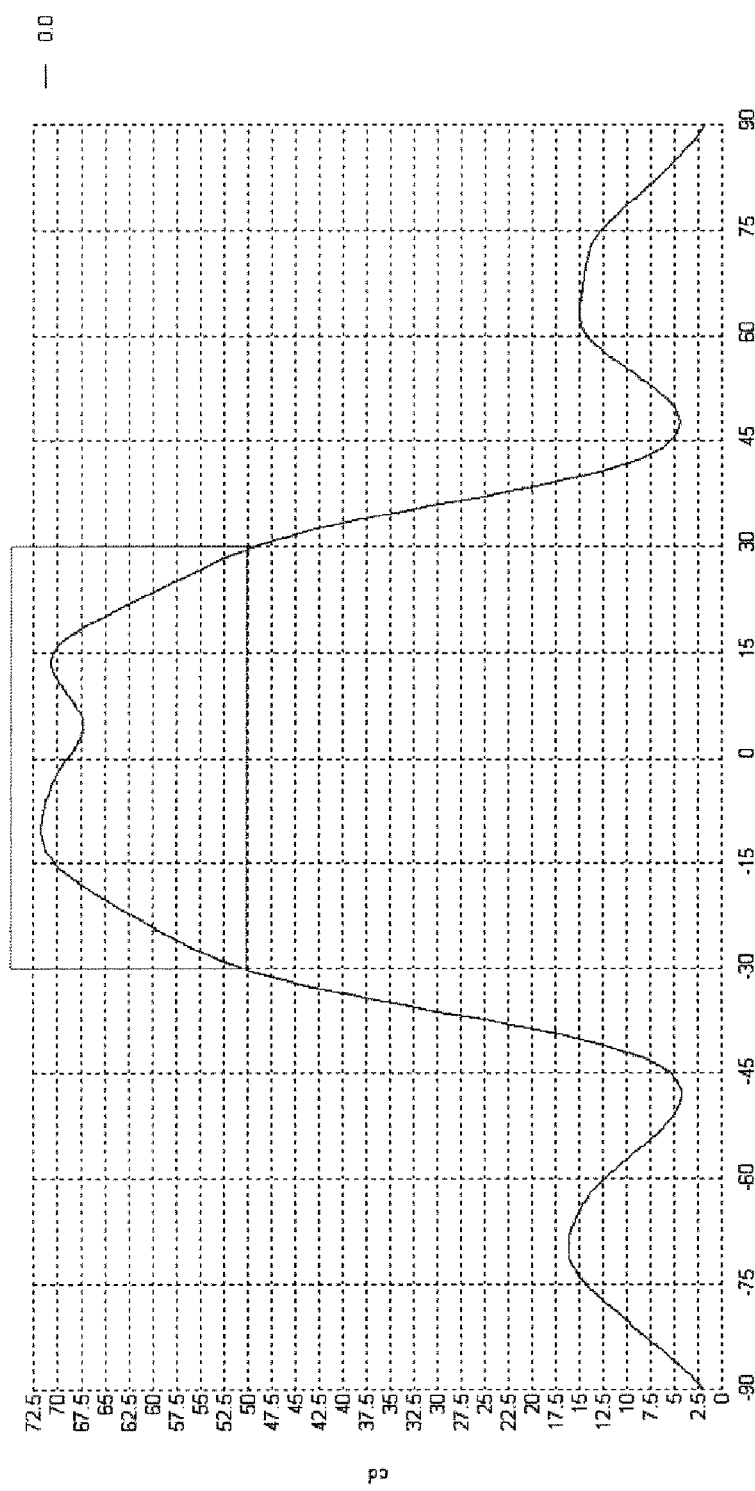

As shown in FIG. 7, second optical films 2b are symmetrically arranged and a first base angle and a second base angle of the second optical film 2b are 40° and 50° respectively. As shown in FIG. 8, after a light source passes the second optical films 2b, a sinking on a light intensity curve is found at center of 0° and, thus, effect of luminous flux is not perfect; yet the sinking is great than that in Example (A).

EXAMPLE (C)

Figure 9:
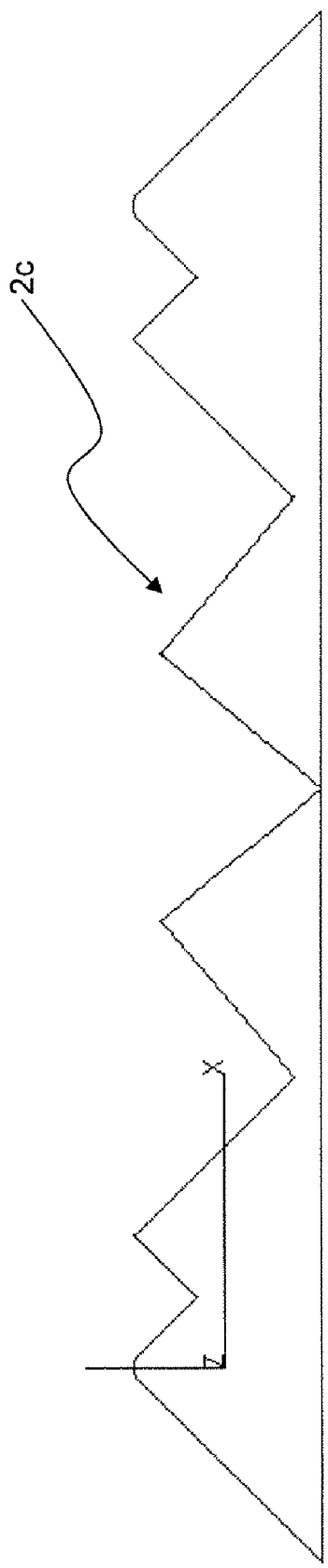
FIG. 9 and FIG. 10 are the views showing the third optical film and its light intensity curve.
Figure 10:
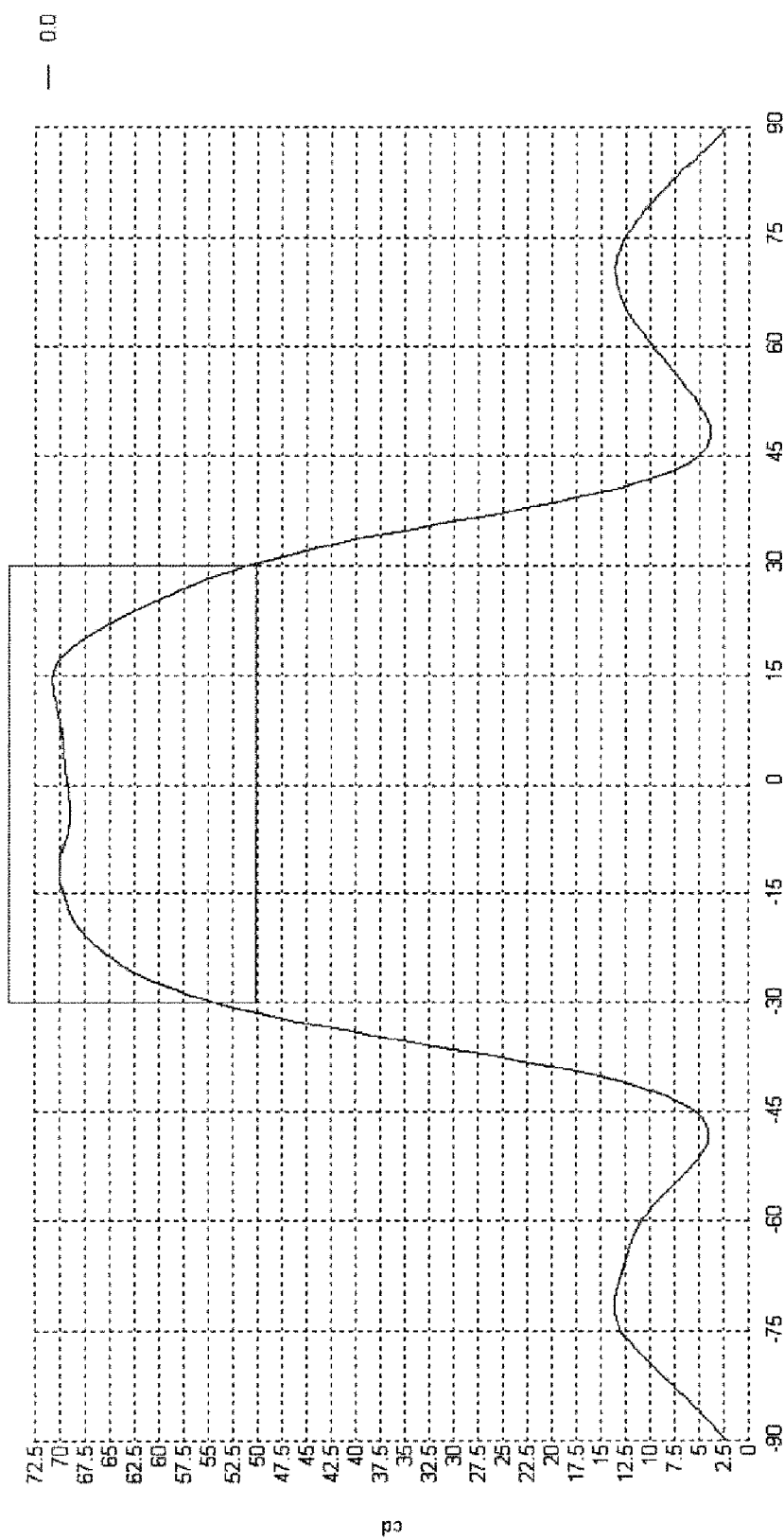

As shown in FIG. 9, third optical films 2c are symmetrically arranged and a first base angle and a second base angle of the third optical film 2c are 50° and 40° respectively. As shown in FIG. 10, after a light source passes the third optical films 2c, a section of a light intensity curve at center of 0° and between +30° and −30° is gentle with a good uniformity. Yet a luminous flux intensity at center of 0° is not so good as that in Example (B).

EXAMPLE (D)

Figure 11:
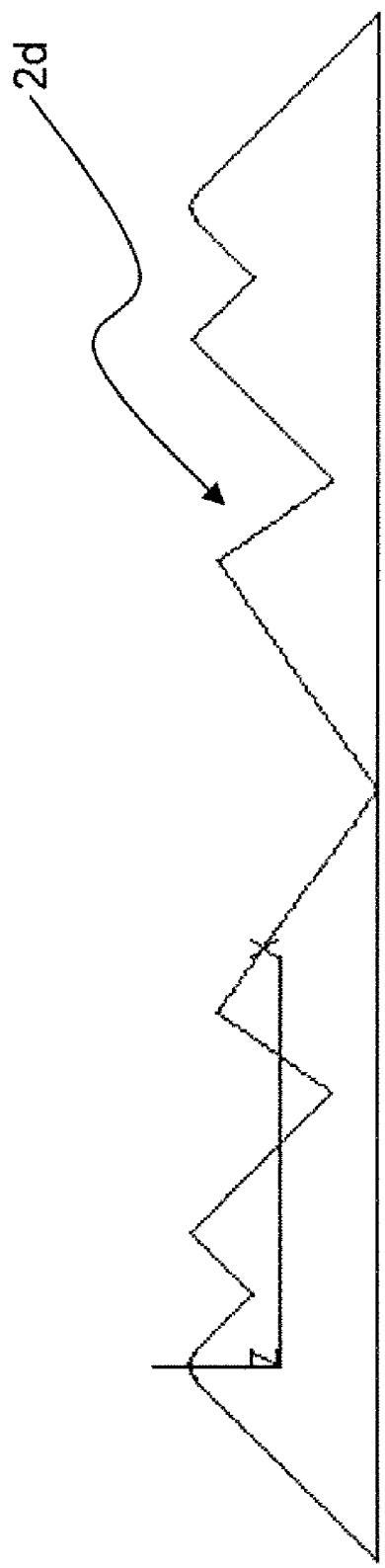
FIG. 11 and FIG. 12 are the views showing the fourth optical film and its light intensity curve.
Figure 12:
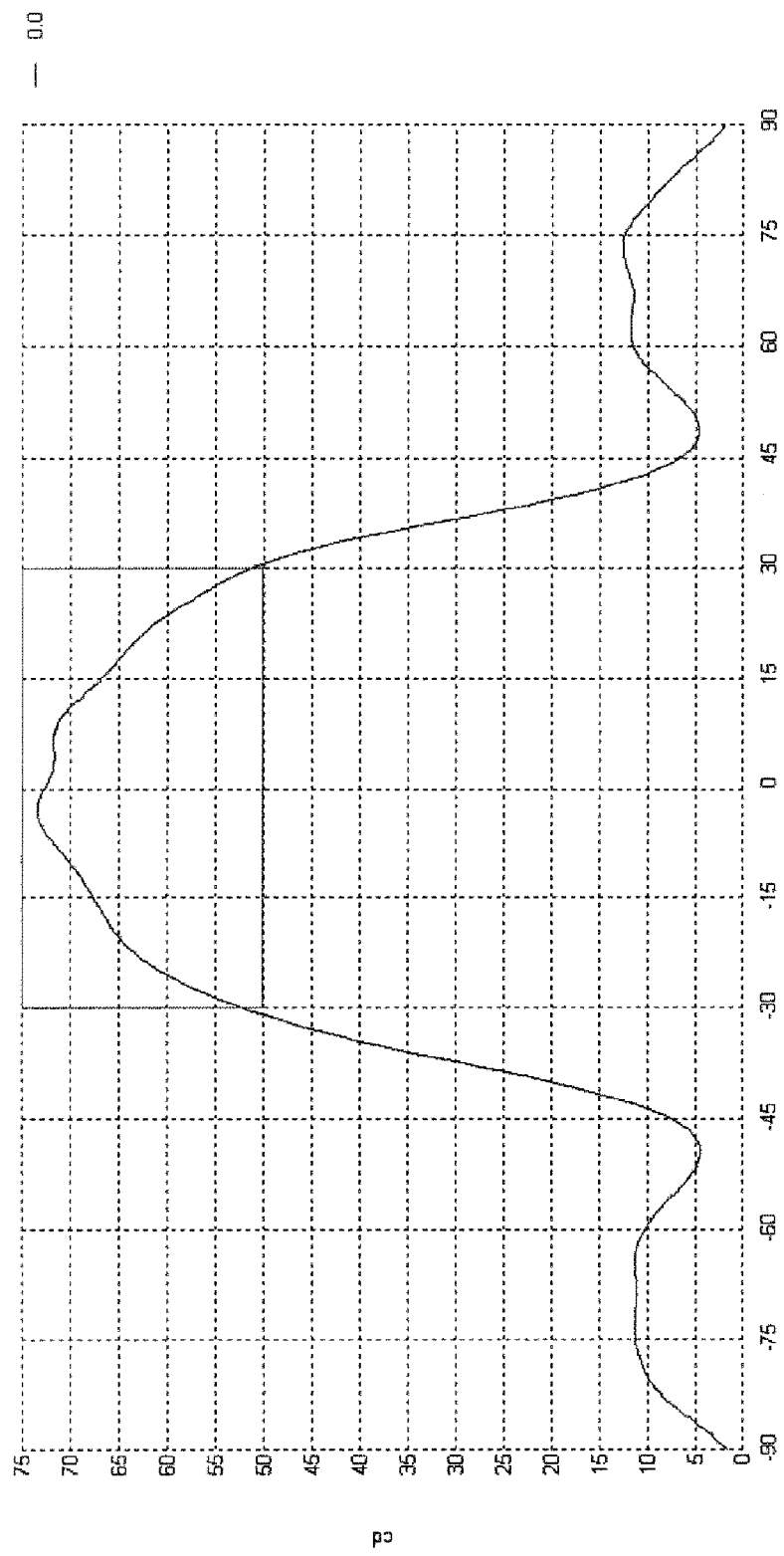

As shown in FIG. 11, fourth optical films 2d are symmetrically arranged and a first base angle and a second base angle of the fourth optical film 2d are 55° and 35° respectively. As shown in FIG. 12, after a light source passes the fourth optical films 2d, light intensities at center of 0° and between +30° and −30° have small differences and a good luminous flux at center of 0° is obtained.

EXAMPLE (E)

Figure 13:
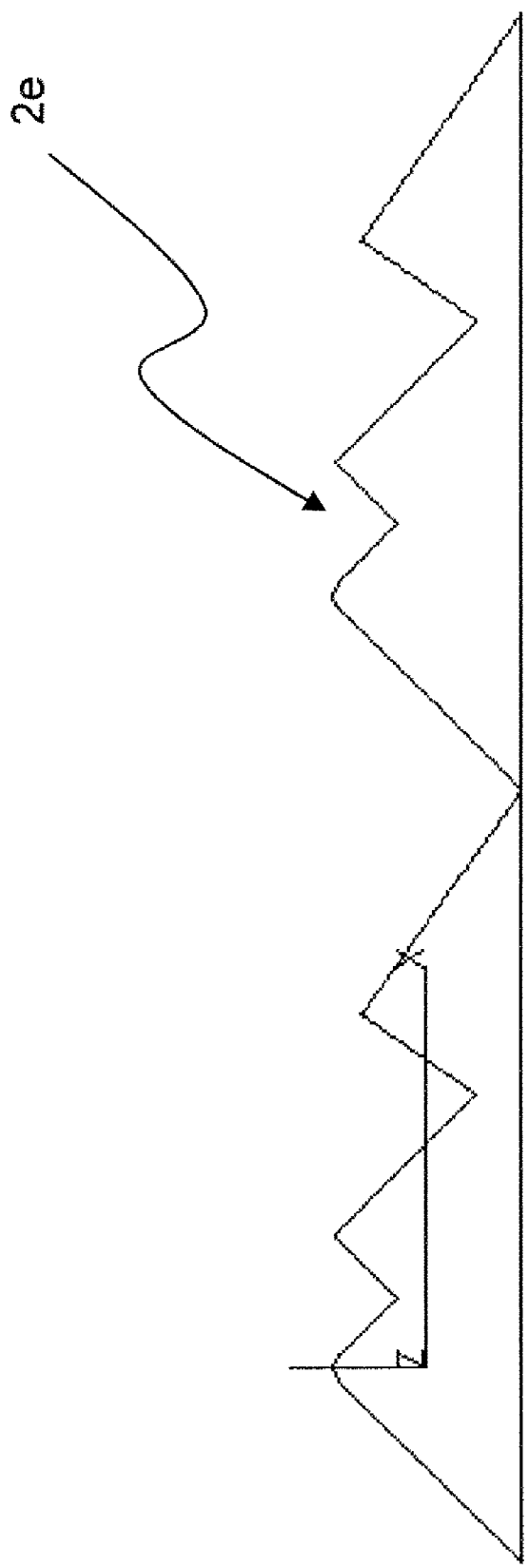
FIG. 13 and FIG. 14 are the views showing the fifth optical film and its light intensity curve.
Figure 14:
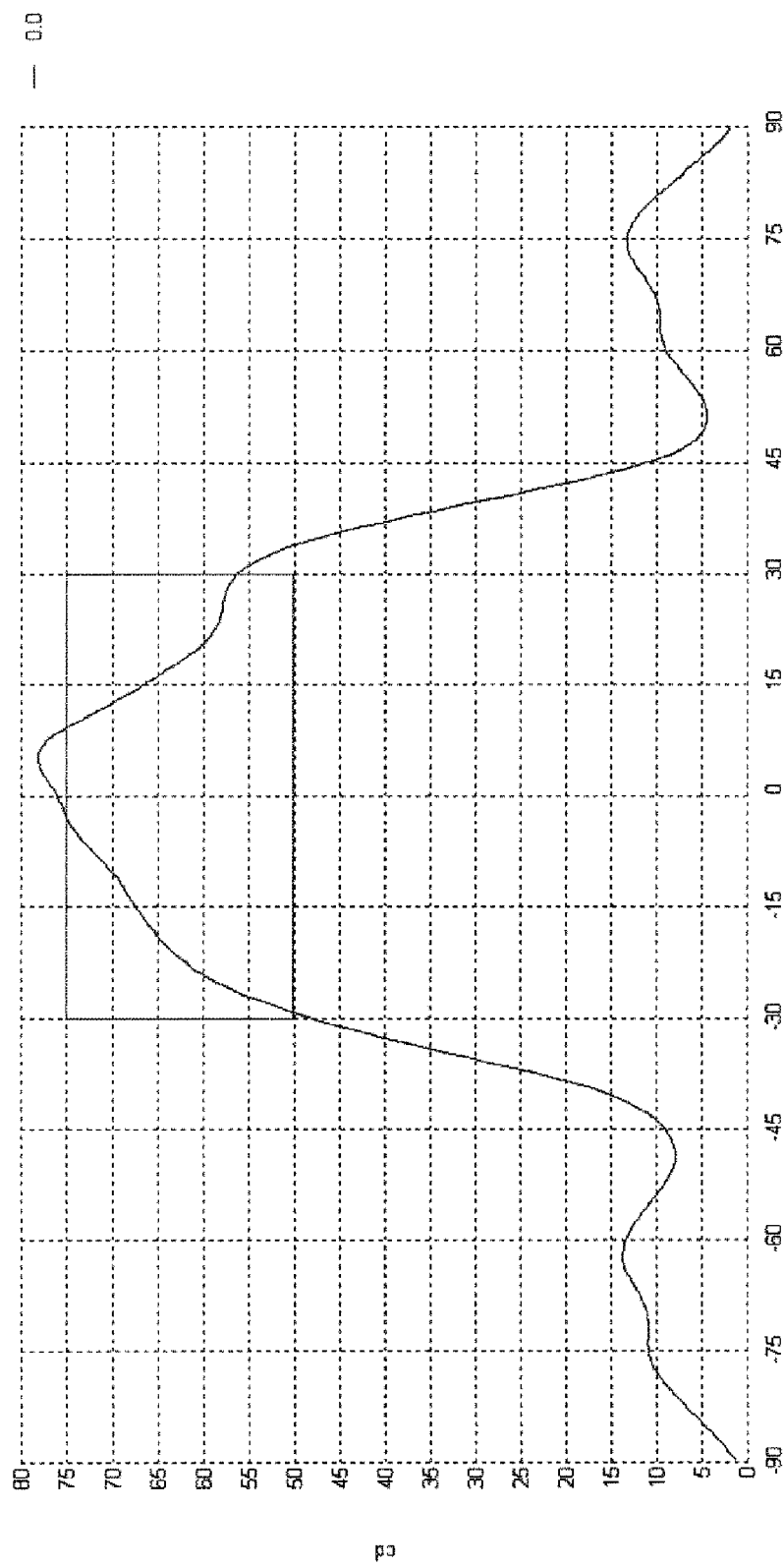
Figure 15:
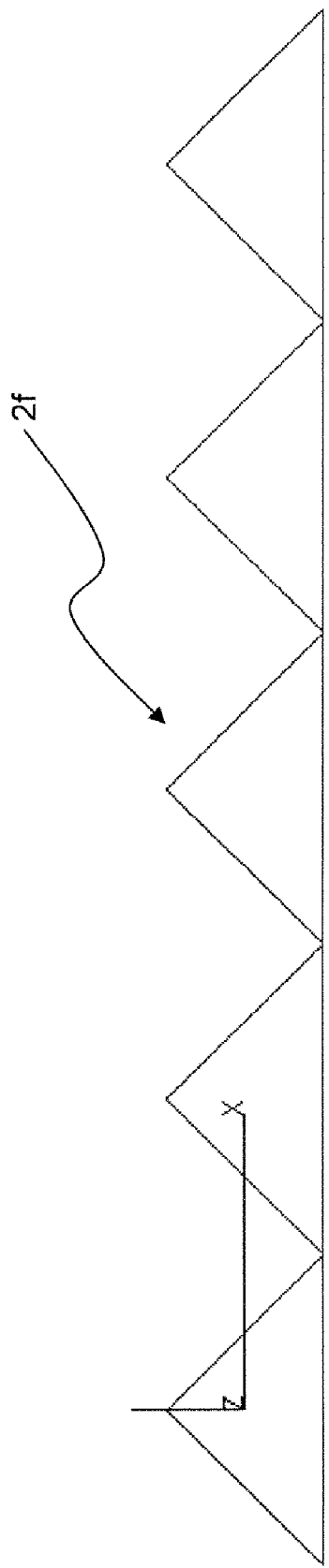
FIG. 15 and FIG. 16 are the views showing the first prior art and its light intensity curve.
Figure 16:
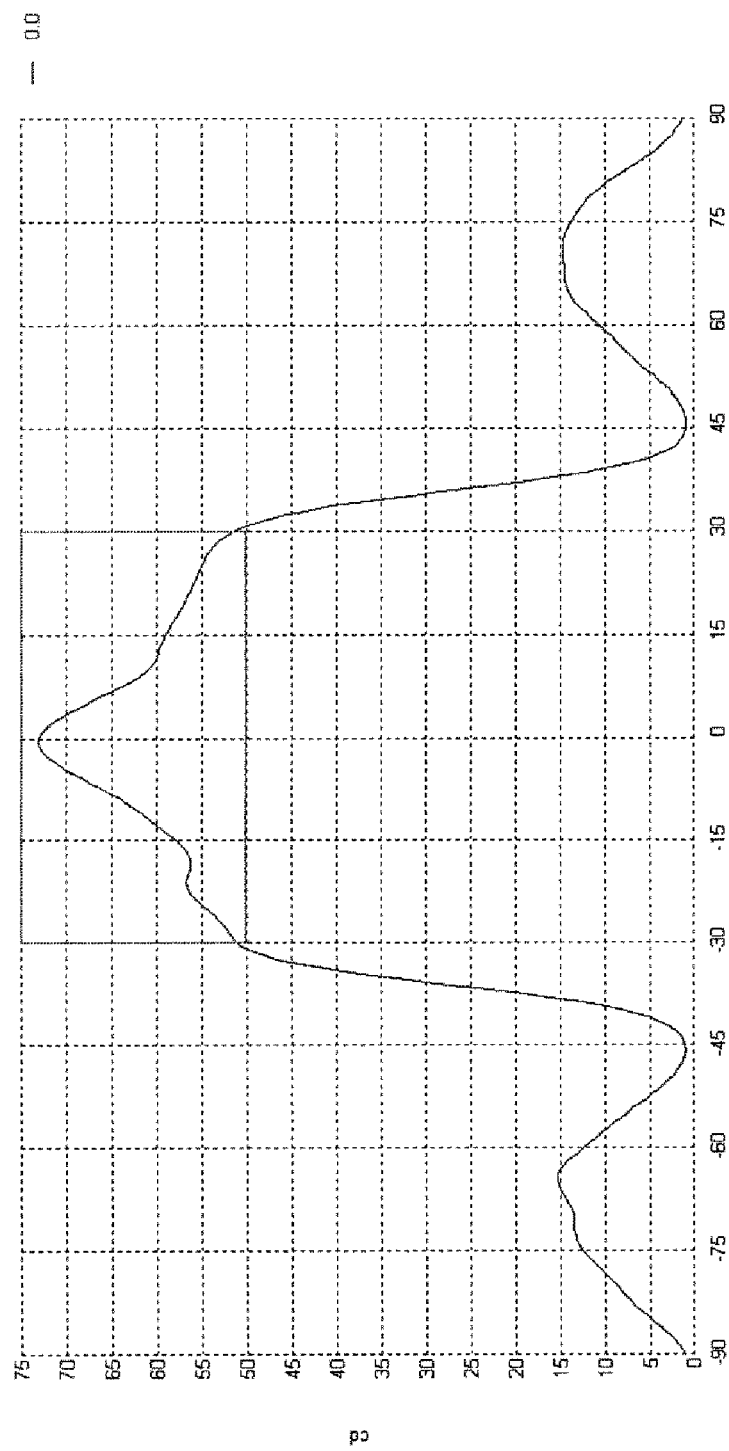
Figure 17:
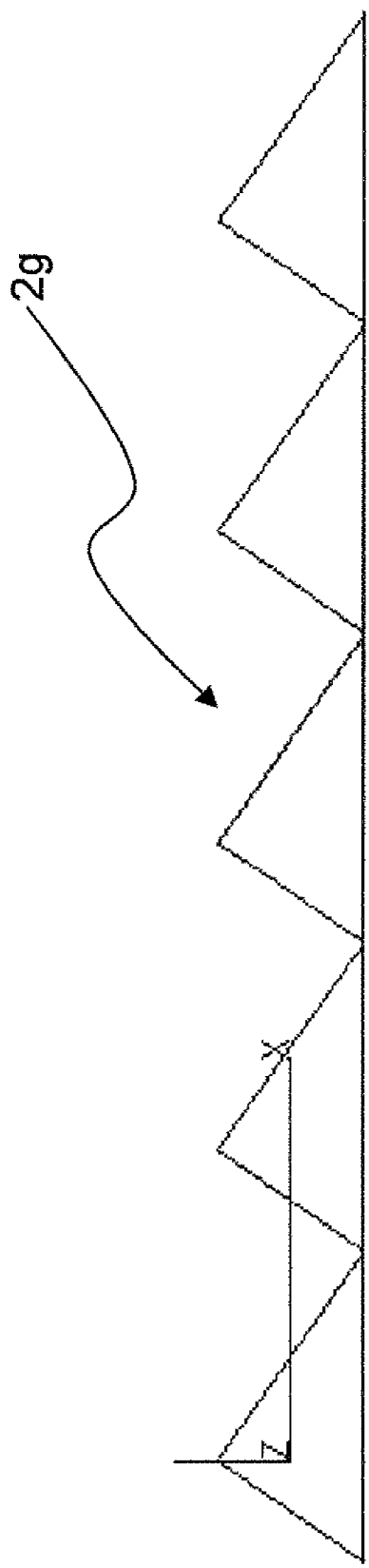
FIG. 17 and FIG. 18 are the views showing the second prior art and its light intensity curve.
Figure 18:
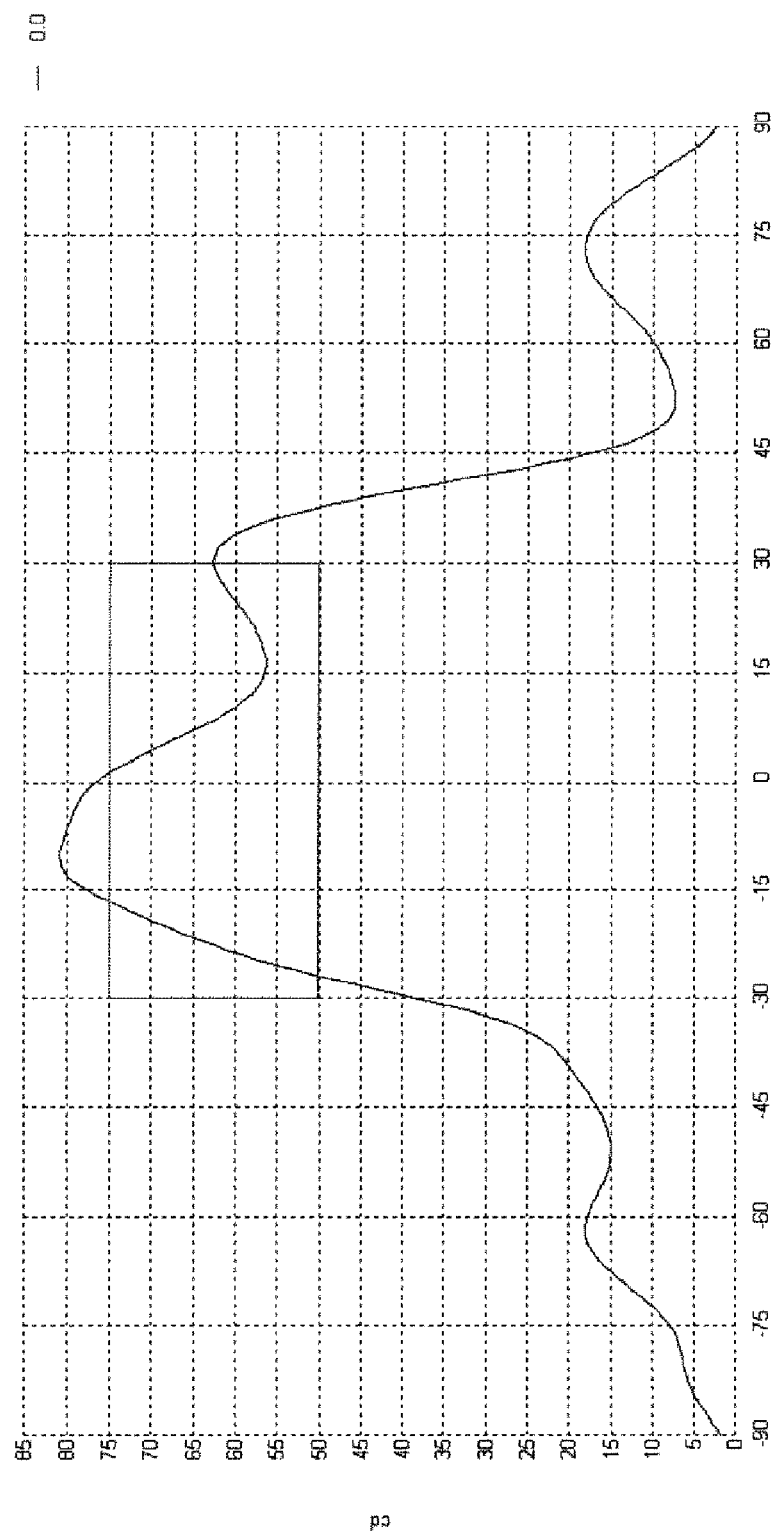
Figure 19:
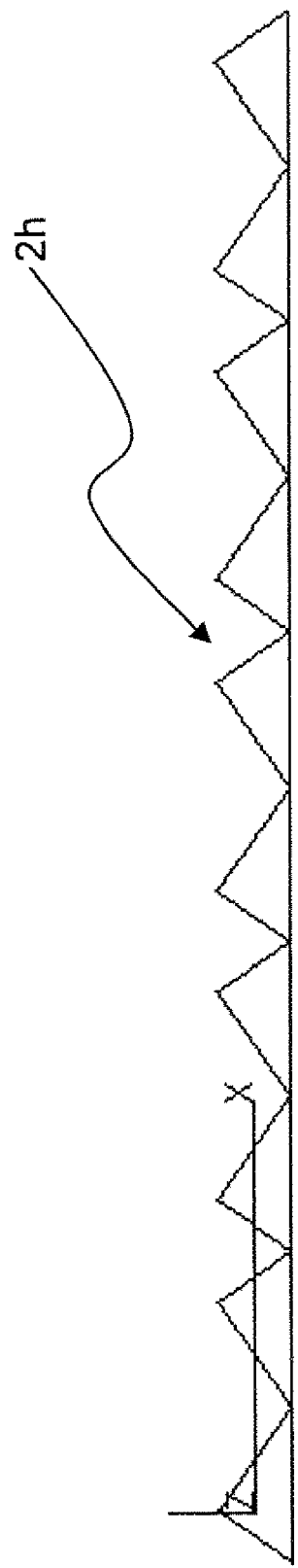
FIG. 19 and FIG. 20 are the views showing the third prior art and its light intensity curve.
Figure 20:
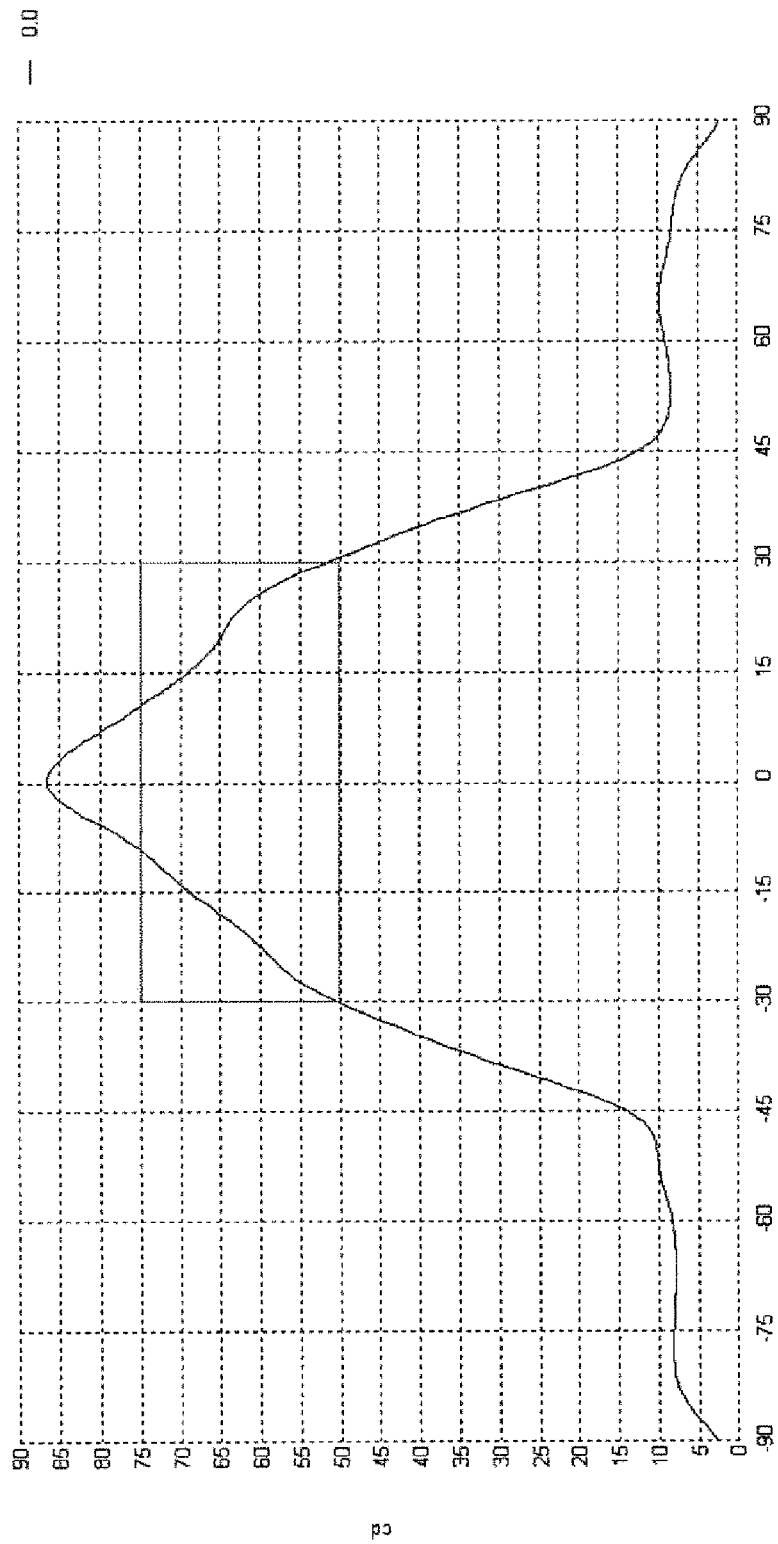

As shown in FIG. 13, fifth optical films 2e are unsymmetrically arranged and a first base angle and a second base angle of the fifth optical film 2e are 55° and 35° respectively. As shown in FIG. 14, after a light source passes the fourth optical films 2e, a good luminous flux at center of 0° is obtained yet a uniformity of light intensity at center of 0° and between +30° and −30° is not perfect.

Hence, the present invention has the following advantages:

1. The present invention uses a symmetrical structure to obtain a uniform light intensity at center and between +30° and −30°; and the symmetrical structure can be extended two, three or more times. However, because a greater extension obtains a worse optical vision, a symmetrical structure not more than twofold is a better choice.

2. The highest apex angle of the present invention has a round vertex to prevent from scratch damages on assembling.

3. A plurality of light-collecting units has non-equal distances between their apex angles and a base line to diminish optical interference of a regular arrangement, and a Morié effect after assembling is thus cured.

4. Because extra static electricity may be left on fabricating an optical film, vertices of the apex angles of the optical film have different heights to solve a wet-out problem accompanying a bad yield owing to the static electricity left.

To sum up, the present invention is an optical film having a uniform luminous flux, where, after passing a light source, a uniform luminous flux is obtained with interior angles having different degrees in a structure of a light-collecting unit.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. An optical film having a uniform luminous flux, comprising
   a plurality of light-collecting units,
   wherein said plurality of light-collecting units has a symmetrical arrangement;
   wherein said plurality of light-collecting units has a first base angle and a second base angle;
   wherein each of said base angles is between 35 degrees (°) and 55°;
   wherein said light-collecting unit has a first apex angle, a second apex angle and a third apex angle;
   wherein each of said first, said second and said third apex angles is between 80° and 100°;
   wherein respective vertical distances between vertices of said first, said second and said third apex angles and a base of said light-collecting unit has a ratio of 22:21±60%:18; and
   wherein vertices of said first, said second and said third apex angles are straightly vertical to said base of said light-collecting unit at three points to obtain a length ratio of 22:15±60%:25±60%:18 by dividing said base of said light-collecting unit with said three points.

2. The film according to claim 1,
   wherein said first interior angle is an apex angle having around vertex.

3. The film according to claim 2,
   wherein said round vertex has a radius between 2 and 5 microns (μm).

4. The film according to claim 1,
   wherein said symmetrical arrangement is extended twice.

5. The film according to claim 1,
   wherein said symmetrical arrangement is extended three times.

* * * * *